United States Patent
Tanimoto (10) Patent No.: US 7,568,031 B2
(45) Date of Patent: Jul. 28, 2009

(54) PRINTING METHOD AND DEVICE FOR RECEIVING DATA FROM A PLURALITY OF DATA SOURCE APPARATUS

(75) Inventor: Akihito Tanimoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1112 days.

(21) Appl. No.: 10/783,026

(22) Filed: Feb. 23, 2004

(65) Prior Publication Data
US 2004/0249956 A1 Dec. 9, 2004

(30) Foreign Application Priority Data
Feb. 24, 2003 (JP) ............................. 2003-046275

(51) Int. Cl.
*G06F 15/173* (2006.01)
(52) U.S. Cl. ................ 709/225; 709/223; 710/36; 340/825; 358/1.15
(58) Field of Classification Search .................. 709/225
See application file for complete search history.

(56) References Cited

U.S. PATENT DOCUMENTS

| | | | | |
|---|---|---|---|---|
| 5,799,206 A | * | 8/1998 | Kitagawa et al. ............... 710/36 |
| 5,995,718 A | * | 11/1999 | Hiraike et al. ............... 358/1.11 |
| 2002/0075510 A1 | * | 6/2002 | Martinez ................... 358/1.15 |
| 2002/0105678 A1 | * | 8/2002 | Shiraiwa .................... 358/1.15 |
| 2004/0169880 A1 | * | 9/2004 | Nakanishi et al. .......... 358/1.15 |
| 2005/0286466 A1 | * | 12/2005 | Tagg et al. ................... 370/329 |

FOREIGN PATENT DOCUMENTS

JP 2002-367280 A 12/2002

* cited by examiner

*Primary Examiner*—Patrice Winder
*Assistant Examiner*—Vivek Krishnan
(74) *Attorney, Agent, or Firm*—Sughrue Mion PLLC (57) ABSTRACT

A printing device for receiving data from a data source apparatus via a communication interface in which one of two connected communication apparatuses is a communication master and the other is a communication slave, the communication master being able to connect to a plurality of communication slaves but the communication slave being able to connect to only one communication master, does not suffer a deterioration in throughput even when the device becomes a communication slave upon reception of a connection request. When a printing device is connected to a first external device, and a connection request outputted from a second external device is detected, first the role of the printing device is set as a communication slave, and then, at a predetermined timing (for example, when a physical connection is established), the role of the printing device is switched from a communication slave to a communication master.

4 Claims, 9 Drawing Sheets

PRINTING METHOD AND DEVICE FOR RECEIVING DATA FROM A PLURALITY OF DATA SOURCE APPARATUS

BACKGROUND OF THE INVENTION

1. Field of the Invention

The present invention relates to a printing device for receiving data from a data source apparatus via a communication interface in which one of two connected communication apparatuses is a communication master and the other is a communication slave, the communication master being able to connect to a plurality of communication slaves but the communication slave being able to connect to only one communication master.

2. Description of the Related Art

This type of printing device includes devices which execute printing upon reception of print data from an external device via a communication interface which adheres to Bluetooth (trademark) specifications, for example (see Japanese Unexamined Patent Application 2002-367280, for example).

In the prior art described above, printing is executed upon reception of a printing request from the external device, and hence the external device becomes the communication master and the printing device becomes a communication slave. According to Bluetooth specifications, a communication slave may only be connected to a single communication master. Hence even when a plurality of devices capable of outputting print data are present, if the printing device is connected to a certain external device, it cannot be connected to the other external devices to receive print data therefrom. This results in a deterioration in throughput.

This problem is not limited to communication interfaces which adhere to Bluetooth specifications, and may occur when print data are received from a data source apparatus via another communication interface in which one of two connected communication apparatuses is a communication master and the other is a communication slave, the communication master being able to connect to a plurality of communication slaves but the communication slave being able to connect to only one communication master.

SUMMARY OF THE INVENTION

It is therefore an object of the present invention to ensure that throughput does not deteriorate even when a printing device becomes a communication slave. To be more precise, for example, it is therefore an object of the present invention to ensure that throughput does not deteriorate even when a printing device for receiving data from a data source apparatus via a communication interface in which one of two connected communication apparatuses is a communication master and the other is a communication slave, the communication master being able to connect to a plurality of communication slaves but the communication slave being able to connect to only one communication master, receives a connection request and thus becomes a communication slave.

A printing method according to the present invention is a method for receiving data from a plurality of data source apparatuses (via a communication interface in which one of two connected communication apparatuses is a communication master and the other is a communication slave, the communication master being able to connect to a plurality of communication slaves but the communication slave being able to connect to only one communication master, for example), and then printing these data. This method comprises the steps of receiving a connection request from a first data source apparatus and establishing a logical connection with said first data source apparatus, setting the role of said printing device as a communication slave initially when a connection request is received from a second data source apparatus while a connection is established with said first data source apparatus, and then switching the role of said printing device from a communication slave to a communication master to enable a connection to be established with both said first and second data source apparatuses, receiving data from said first and second data source apparatuses while the connections are also established with said first and second data apparatuses, processing and printing said data received from said first data source apparatus, processing and printing said data received from said second data source apparatus.

In a preferred embodiment, the printing method further comprises the following step, a step in which, when a logical connection is established with said second data source apparatus and data are received from said second data source apparatus while a connection is also established with said first data source apparatus and data received from said first data source apparatus are being transferred to a first data processing portion from among a plurality of data processing portions for processing data received from said data source apparatuses, said received data are stored temporarily in a buffer, and when said data can be transferred to a second data processing portion, said data are read from said buffer and transferred to said second data processing portion.

In a preferred embodiment, the printing method further comprises the following step, a step in which, when a logical connection is established with said second data source apparatus and a command or data are received from said second data source apparatus while a logical connection is also established with said first data source apparatus and data received from said first data source apparatus are being transferred to a first data processing portion from among a plurality of data processing portions for processing data received from said data source apparatuses, transmission of a response signal to said second data source apparatus is delayed, and when the data received from said second data source apparatus can be transferred to a second data processing portion, said response signal is transferred to said second data source apparatus.

In a preferred embodiment, the printing method further comprises the following step, a step in which, when a logical connection is established with the second data source apparatus and a request for notification of a credit value indicating the data size of the receivable data is received from the second data source apparatus while a connection is also established with the first data source apparatus and data received from the first data source apparatus are being transferred to a first data processing portion from among a plurality of data processing portions for processing data received from the data source apparatuses, the second data source apparatus is informed of this credit value in response to the notification request, and thus data are received from the second data source apparatus, stored temporarily in a buffer, and when the data can be transferred to a second data processing portion, the data are read from the buffer and transferred to the second data processing portion. In the transfer step, for example, when an empty region having a size which is equal to or greater than the credit value cannot be retained in the buffer upon reception of a credit value notification request from the second data source apparatus, a credit value indicating zero is transmitted back to the second data source apparatus. In the connection step, for example, a logical connection is established with the data source apparatus in accordance with Bluetooth specifications, and in the transfer step HCRP is performed.

In the connection step of a preferred embodiment, a connection is established with the data source apparatus in accordance with Bluetooth specifications, and in the transfer step or transmitting back step, a profile provided on an upper OBEX level is executed. This profile is BPP or BIP, for example.

A printing device according to the present invention is a printing device for receiving data from a plurality of data source apparatuses (via a communication interface in which one of two connected communication apparatuses is a communication master and the other is a communication slave, the communication master being able to connect to a plurality of communication slaves but the communication slave being able to connect to only one communication master, for example). The device comprises connection component receiving connection requests from said data source apparatuses, establishing a logical connection with each of the data source apparatuses, and receiving data from the data source apparatuses, and role setting component setting the role of the printing device to either a communication slave or a communication master when the connection component receives a connection request from each of the data source apparatus. When the connection component receives a connection request from a second data source apparatus while logically connected to the first data source apparatus, the role setting component set the role of the printing device as a communication slave initially, and then alter the role of the printing device from a communication slave to a communication master to enable a logical connection to be established with both the first and second data source apparatuses via the connection component.

In a preferred embodiment, the printing device comprises a plurality of data processing portions for processing data received by the connection component from the data source apparatus, transfer control component selectively transferring the received data to one of the plurality of data processing portions, and a buffer for storing the received data temporarily. In this case, when the connection component is connected to the second data source apparatus and receives data from the second data source apparatus while the connection component is also connected to the first data source apparatus and data received from the first data source apparatus by the connection component is being transferred to a first data processing portion from among the plurality of data processing portions, the transfer control component store the data temporarily in the buffer, and when the data can be transferred to a second data processing portion, the data are read from the buffer and transferred to the second data processing portion.

For example, when the connection component is connected to the data source apparatus in accordance with Bluetooth specifications, the transfer control component is a profile provided on an upper OBEX level, BPP or BIP serving as specific examples of this profile.

The phrase "when data received from the second data source apparatus can be transferred to the second data processing portion" indicates the time at which a second data transfer channel is established from among a plurality of data transfer channels leading to the plurality of data processing portions, each channel corresponding respectively to the plurality of data processing portions. For example, transfer channel switching component for selectively establishing one data transfer channel from among the plurality of data transfer channels are further comprised, and hence when the transfer control component transmit a transfer channel establishment command to the transfer channel switching component to command the establishment of a desired data transfer channel, and notification indicating that the desired data transfer channel could not be established (to be referred to as an "establishment error" below) is received from the transfer channel switching component, this transfer channel establishment command is repeatedly transmitted either as needed or periodically until notification of successful establishment (to be referred to as "establishment success" below) is received. In this case, the phrase "when data received from the second data source apparatus can be transferred to the second data processing portion" indicates the time at which the transfer control component receive notification of establishment success from the transfer channel switching component.

In another preferred embodiment, the printing device comprises a plurality of data processing portions for processing data received by the connection component from the data source apparatus, and transfer control component receiving data from a data source apparatus by receiving a command or data (for example, a data transmission request) from the data source apparatus and transmitting a response signal to each of the data source apparatus in response thereto, and then selectively transferring the received data to one of the plurality of data processing portions. When the connection component is connected to the second data source apparatus and receive a command or data from the second data source apparatus while the connection component is also connected to the first data source apparatus and data received from the first data source apparatus by the connection component is being transferred to a first data processing portion from among the plurality of data processing portions, the transfer control component delay the transmission of a response signal to the second data source apparatus in response to the command or data, and when the data received from the second data source apparatus can be transferred to the second data processing portion, the response signal is transmitted to the second data source apparatus.

In a further preferred embodiment, the printing device comprises a plurality of data processing portions for processing data received by the connection component from the data source apparatus, a buffer for storing the received data temporarily, and transfer control component which, when the connection component receives a request from each of the data source apparatuses for notification of a credit value indicating the data size of the data that can be received by the printing device, inform the data source apparatus of the credit value in response to this notification request, and thus receives data from the data source apparatuses in a data size that is equal to or less than the credit value. The transfer control component then selectively transfer these received data to one of the plurality of data processing portions. When the connection component is connected to the second data source apparatus and a request for notification of the credit value is received from the second data source apparatus while the connection component is also logically connected to the first data source apparatus and data received from the first data source apparatus are being transferred to a first data processing portion from among the plurality of data processing portions, the transfer control component informs the second data source apparatus of the credit value in response to the notification request, and thus receive data from the second data source apparatus, store the data temporarily in the buffer, and when the data can be transferred to the second data processing portion, read the data from the buffer and transfer the data to the second data processing portion. In a further preferred embodiment, when a request for notification of the credit value is received from the second data source apparatus and buffer management component are unable to retain an empty region in the buffer of a size that is equal to or greater than the credit value, the transfer control component transmits a credit value indicating zero to the second data source apparatus.

When the connection component is connected to the data source apparatus in accordance with Bluetooth specifications, the transfer control component are HCRP, for example.

Each of the components constituting the printing device of the present invention may be implemented by computer. In order to implement these components, a computer program may be installed or loaded into the computer through various media such as disk storage, semiconductor memory, and a communication network.

DESCRIPTION OF THE PREFERRED EMBODIMENTS

Figure 1:
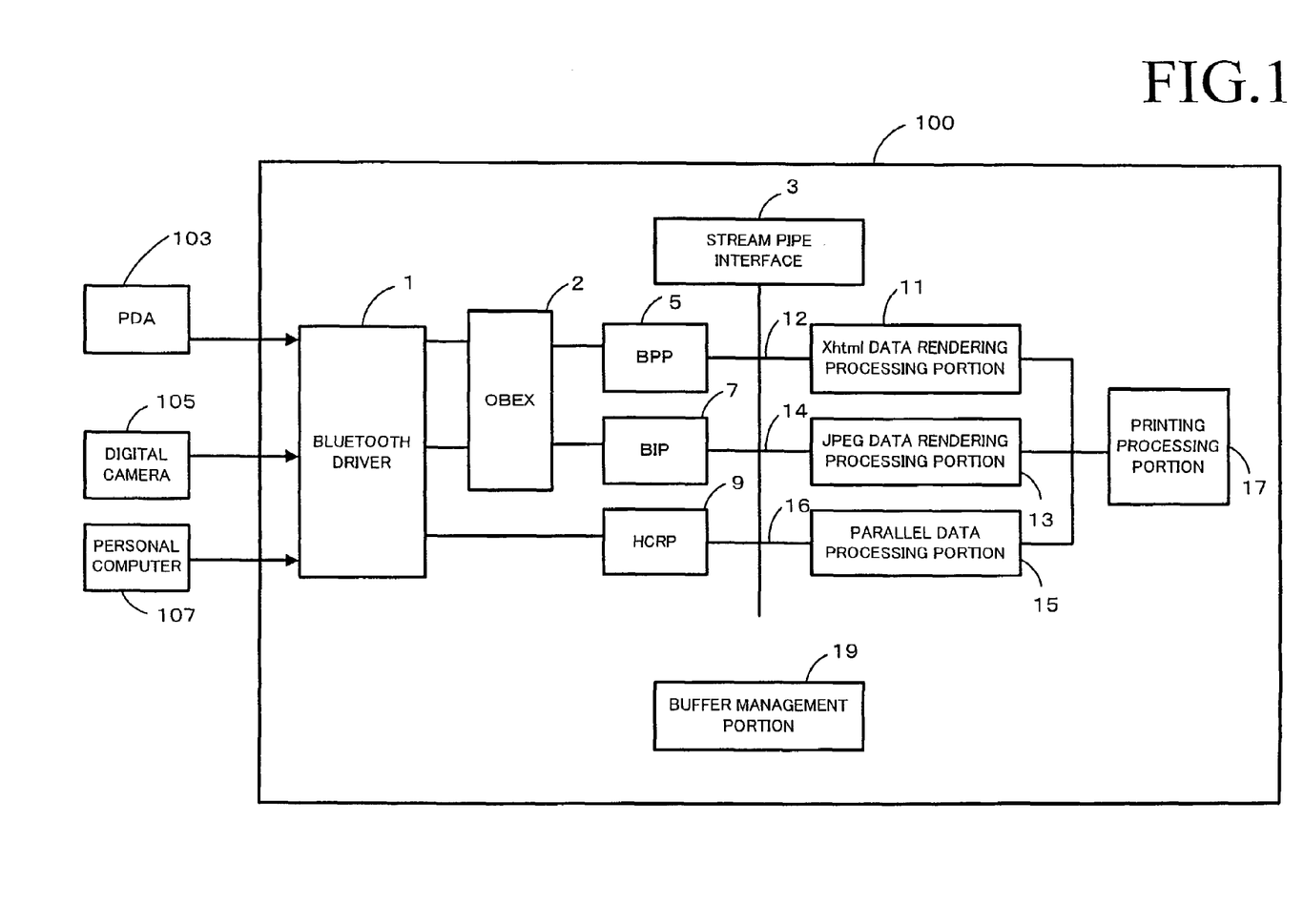
FIG. 1 is a block diagram of a printing device 100 according to an embodiment of the present invention.

FIG. 1 shows a printing device according to an embodiment of the present invention.

Figure 9:
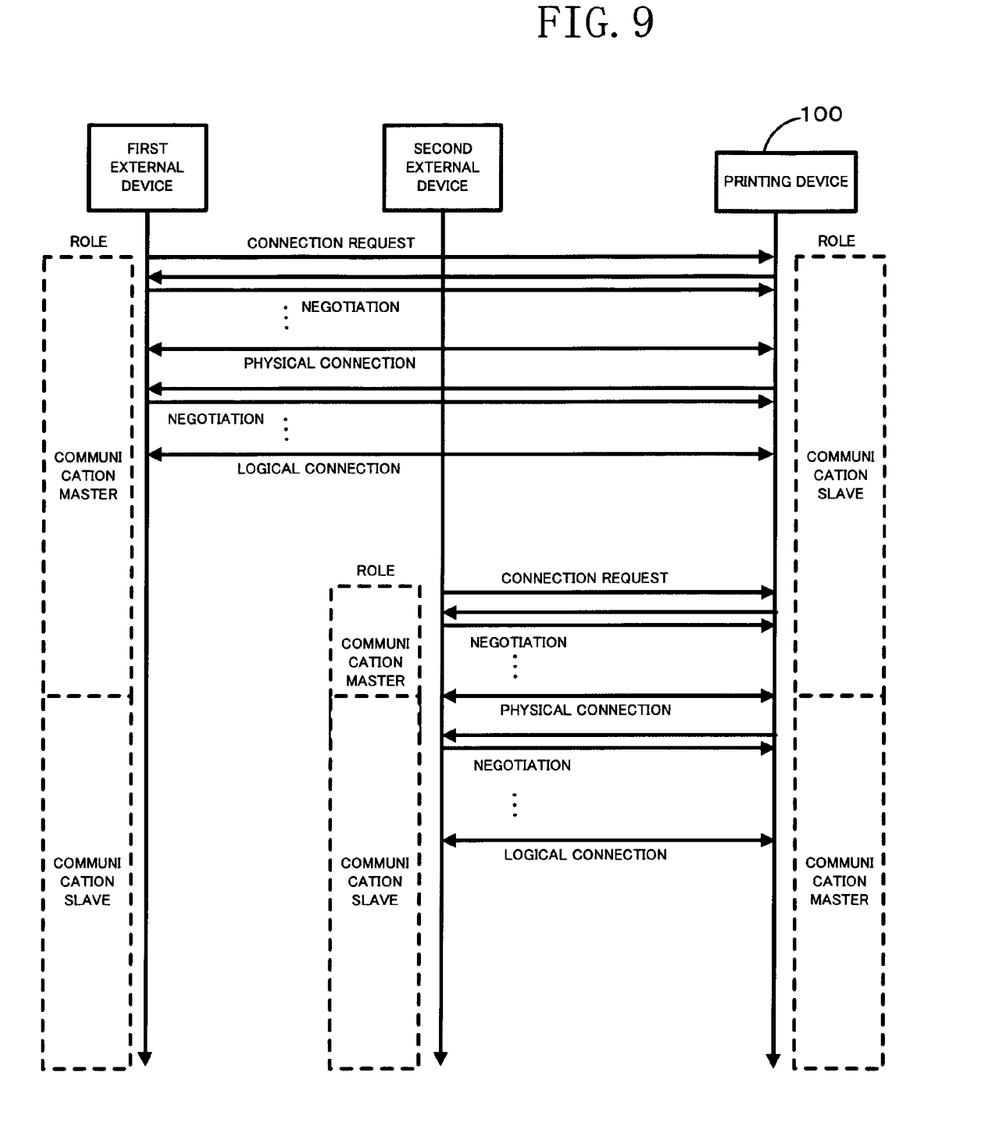
FIG. 9 is a view showing a flow of a communication between a printing device 100 and a plurality of external devices.

The printing device 100 is capable of performing communication in accordance with Bluetooth specifications (to be referred to as "Bluetooth communication" below) with an external device that is capable of Bluetooth communication, and is also capable of operating as a peripheral apparatus of an external device and as a so-called stand-alone machine. The printing device 100 is capable of receiving print data when connected to a plurality of types of external devices, for example a PDA (Personal Digital Assistant) 103, a digital camera 105, and a personal computer (to be abbreviated to "PC" below). More specifically, for example, as shown in FIG. 9, when the printing device 100 is connected to a first external device (for example, the PDA 103) and a connection request outputted from a second external device (for example, the digital camera 105) is detected, first the role of the printing device 100 is set as a communication slave, and thereafter the role of the printing device 100 is switched from a communication slave to a communication master either automatically or manually at a predetermined timing (for example, when a physical connection is established). In so doing, the printing device 100 can be logically connected to both the first and second external devices. By the way, above role change is carried out in after-mentioned Bluetooth driver in printing device firmware by being transmitted intentionally a HCI (Host Control Interface) command to LMP (Link Manager Protocol) which is set in a baseband portion being existed in Bluetooth module including a RF portion and a baseband portion.

The printing device 100 comprises a Bluetooth driver 1, an OBEX (Object Exchange Protocol) 2, a BPP (Basic Printing Profile) 5, a BIP (Basic Imaging Profile) 7, an HCRP (Hardcopy Cable Replacement Profile) 9, an Xhtml data rendering processing portion 11, a JPEG data rendering processing portion 13, a parallel data processing portion 15, a buffer management portion 19, a stream pipe interface portion 3, and a printing processing portion 17.

The Bluetooth driver 1 detects a connection request outputted from an external device (for example, the PDA 103), transmits a predetermined response signal to the external device in response to the connection request, and thereafter exchanges signals several times with the external device until a physical connection is established with the external device. The Bluetooth driver 1 also defines a logical channel between the external device and a predetermined profile from among a plurality of upper level profiles on the basis of the signals from the external device. Thus a logical connection is established with the external device, and when the Bluetooth driver 1 receives data from the external device, the data can be transferred to the predetermined profile over the defined logical channel. For example, when the Bluetooth driver 1 receives a connection request from the PDA 103 or a portable telephone (not shown), and establishes a logical connection therewith, the Bluetooth driver 1 enables communication between the PDA 103 or portable telephone and the BPP 5 via the OBEX 2. When a connection request is received from and a logical connection is established with the digital camera 105 (or a portable telephone equipped with a digital camera, for example), the Bluetooth driver 1 enables communication between the digital camera 105 and the BIP 7 via the OBEX 2, and when a connection request is received from and a logical connection is established with the personal computer 107, the Bluetooth driver 1 enables communication between the personal computer 107 and the HCRP 9.

The constitution of the Bluetooth driver 1 will be described simply below.

In sequence from the lower to the upper level, the Bluetooth driver 1 comprises an RF portion, a baseband portion, a link manager, an L2CAP (Logical Link Control and Adaptation Protocol), and RFCOMM (RF Communication). The RF portion performs amplification, selection, and so on of RF signals. The baseband portion executes transmission, reception, and so on of various packets. The link manager establishes and releases connections, switches the packet type in accordance with the communication channel condition, and so on. The L2CAP establishes a plurality of data transmission channels (logical channels) on a Bluetooth system wireless link, defines a plurality of logical channels such that data on a plurality of upper level protocols can be transmitted and received on a single physical interface, and so on. The RFCOMM is a protocol for emulating a serial port over the L2CAP. The RF portion and the baseband portion is set in one or more communication interface circuit in the printing device 100. Link manager and so on being upper than the baseband portion are set in a printing device's firmware. Furthermore a physical connection is established between the external device and the RF portion, and between the external device and the baseband portion. A logical connection is established between the external device and the Link manager and so on.

The OBEX 2 is a protocol positioned over the RFCOMM. In the data communication performed via the OBEX 2, data are not transmitted from a communication slave until the communication master transmits a predetermined response signal in response to a transmission request received from the communication slave.

The BPP 5 is a protocol positioned over the OBEX 2. The BPP 5 receives data from the PDA 103 (or portable telephone) via the Bluetooth driver 1, and if the first data transfer channel linking the BPP 5 and Xhtml data rendering processing portion is formed at that time (in other words, if the first data transfer channel 12 is open), the received data are transferred to the Xhtml data rendering processing portion 11 over the first data transfer channel 12. If, on the other hand, the first data transfer channel 12 is not formed (that is, if the first data transfer channel 12 is closed) when the data are received, the BPP 5 stores the received data temporarily in a predetermined buffer via the buffer management portion 19. When the first data transfer channel 12 is formed (or in other words, when the first data transfer channel 12 is opened) thereafter, the BPP 5 retrieves the data stored in the buffer via the buffer management portion 19 and transfers the data to the Xhtml data rendering processing portion 11 over the first data transfer channel 12. Note that the format of the data that are received and transferred by the BPP 5 is not limited to Xhtml, and may also be Basic Text, vCard, vCalendar, JPEG, PDF, and so on, for example.

The BIP 7 is a protocol positioned over the OBEX 2. The BIP 7 receives data from the digital camera 105 via the Bluetooth driver 1, and if a second data transfer channel 14 linking the BIP 7 and the JPEG data rendering processing portion 13 is formed at that time (or in other words, if the second data transfer channel 14 is open), transfers the received data to the JPEG data rendering processing portion 13 over the second data transfer channel 14. If, on the other hand, the second data transfer channel 14 is not formed (that is, if the second data transfer channel 14 is closed) when the data are received, the BIP 7 stores the received data temporarily in a predetermined buffer via the buffer management portion 19. When the second data transfer channel 14 is formed (or in other words, when the second data transfer channel 14 is opened) thereafter, the BIP 7 reads the data stored in the buffer via the buffer management portion 19 and transfers the data to the JPEG data rendering processing portion 13 over the second data transfer channel 14. Note that the format of the received image may be a format other than JPEG.

The HCRP 9 is a protocol positioned over the L2CAP. The HCRP 9 receives data from the personal computer (to be abbreviated to "PC" below) 107 via the Bluetooth driver 1, and if a third data transfer channel 16 linking the HRCP 9 and parallel data processing portion 15 is formed at that time (in other words, if the third data transfer channel 16 is open), the received data are transferred to the parallel data processing portion 15 over the third data transfer channel 16. If, on the other hand, the third data transfer channel 16 is not formed (that is, if the third data transfer channel 16 is closed) when the data are received, the HRCP 9 stores the received data temporarily in a predetermined buffer via the buffer management portion 19. When the third data transfer channel 16 is formed (or in other words, when the third data transfer channel 16 is opened) thereafter, the HRCP 9 retrieves the data stored in the buffer via the buffer management portion 19 and transfers the data to the parallel data processing portion 15 over the third data transfer channel 16. Note that when data are to be transferred over a data transfer channel, the HRCP 9 and the other profiles 5, 7 retrieve the data stored in the buffer and transfer these data.

The Xhtml data rendering processing portion 11 is an example of a first data processing portion which creates print image data on the basis of data in an Xhtml (Extensible HyperText Markup Language) format received from the PDA 103 via the BPP 5. The Xhtml data rendering processing portion 11 transmits the created print image data to the printing processing portion 17.

The JPEG data rendering processing portion 13 is an example of a second data processing portion which creates print image data on the basis of image data in a JPEG format received from the digital camera 105 via the BIP 7. The JPEG data rendering processing portion 13 transmits the created print image data to the printing processing portion 17.

The parallel data processing portion 15 is an example of a third data processing portion which transfers parallel data (print image data) received from the PC 107 via the HCRP 9 to the printing processing portion 17.

The buffer management portion 19 manages a buffer for temporarily storing data received by each profile 5, 7, or 9 from an external device. Several buffer management methods may be considered, but two examples will be described below.

(1) First Buffer Management Method

Having received data from the profile 5, 7, or 9, the buffer management portion 19 allots a unique ID (to be referred to as "data ID" below) to the data and returns the data ID to the data transmission source profile. The buffer management portion 19 also stores the data received from the profile 5, 7, or 9 in a buffer, and manages the data on the basis of the allotted data ID, the data storage destination, and the data size. In order to retrieve desired data via the buffer management portion 19, the profile 5, 7, or 9 transmits to the buffer management portion 19 the data ID of the desired data from among the data IDs notified by the buffer management portion 19, and is thus able to retrieve the desired data via the buffer management portion 19.

(2) Second Buffer Management Method

When data received from the Bluetooth driver 1 are to be stored in a buffer via the buffer management portion 19, the profile 5, 7, or 9 allots a data ID to the received data and transmits the received data to the buffer management portion 19 together with the data ID. The buffer management portion 19 stores the received data in the buffer, and manages the data on the basis of the transmitted data ID, the data storage destination, and the data size. When desired data are to be retrieved via the buffer management portion 19, the profile 5, 7, or 9 transmits the data ID of the desired data to the buffer management portion 19, and is thus able to retrieve the desired data via the buffer management portion 19.

The stream pipe interface portion 3 is an interface of a stream pipe (for example, a partial recording region of a predetermined memory) for forming the first to third data transfer channels 12, 14, 16, and serves to open one of the first to third data transfer channels 12, 14, 16 and close the others, or in other words to perform data transfer channel switching. When a certain data transfer channel is closed and a request to open that data transfer channel is received from a profile which is capable of connecting with the data transfer channel, and if data transfer is not underway over another open data transfer channel, the stream pipe interface portion 3 closes the other data transfer channels, opens the aforementioned data transfer channel, and thus enables data to be transferred over the opened data transfer channel.

The printing processing portion 17 prints a printed image on a predetermined printing medium such as paper or an OHP file on the basis of print image data received from the rendering processing portions 11, 13 and the data processing portion 15.

The printing sequence of each profile 5, 7, and 9 will be described below divided into a case in which the data transfer channel from the profile to the downstream data processing portion is open, and a case in which the channel is closed. Note that in the following description, it is assumed that when the printing device 100 is physically connected to an external device, the role of the printing device 100 switches from a communication slave to a communication master, and thus the printing device 100 is connected to the external device as a communication master. In other words, the flowcharts in FIGS. 2 through 8 illustrate cases in which the printing device 100 is a communication master.

Figure 2:
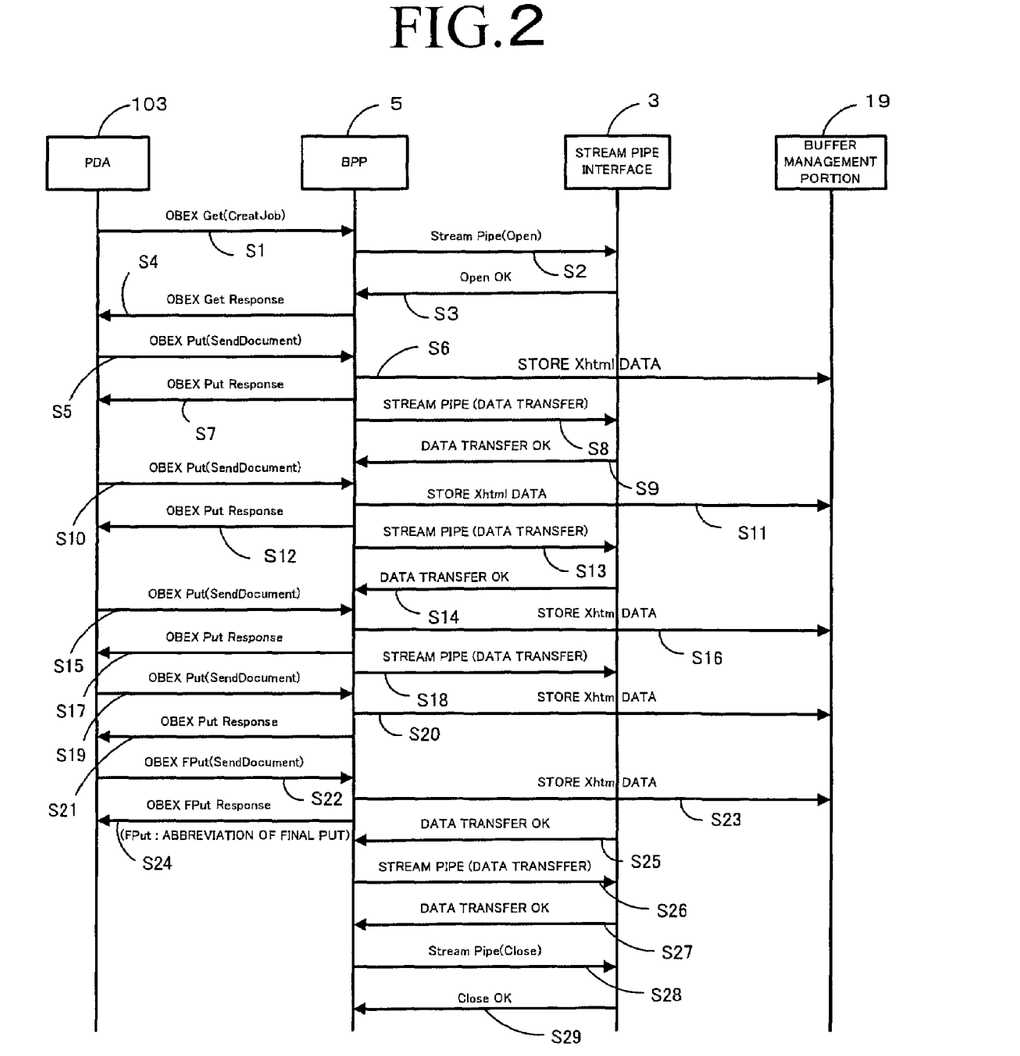
FIG. 2 is a view showing a printing sequence of a BPP 5 in a case where a first data transfer channel 12 of the BPP 5 can be opened.

FIG. 2 shows a printing sequence of the BPP 5 when the first data transfer channel 12 can be opened.

The printing sequence illustrated in the drawing is implemented when printing processing is performed according to Job-Based Transfer, or in other words when printing processing is performed on the basis of a job ID.

The PDA 103 transmits an OBEX Get (Create Job) packet to the BPP 5, or in other words requests job creation (more precisely, job ID creation) of the BPP 5 (step S1). In response thereto, the BPP 5 transmits a Stream Pipe (Open) packet to the stream pipe interface (to be referred to as "stream pipe IF" below) 3, or in other words places a request with the stream pipe IF 3 to open the first transfer channel 12 (that is, to form the first transfer channel 12) (S2). If the stream pipe IF 3 is capable of opening the first transfer channel 12, it does so, and then notifies the BPP 5 that the first transfer channel 12 is open (to be referred to as "open OK" below) (S3).

Having received the open OK notification from the stream pipe IF 3, the BPP 5 transmits a signal indicating success, or in other words a signal indicating that data reception is possible (to be referred to as a "reception possible signal" below) to the PDA 103 as an OBEX Get Response (S4). Having received the reception possible signal from the BPP 5, the PDA 103 transmits an OBEX Put (Send Document) packet, or in other words print data (Xhtml data) to the BPP 5 (S5).

Having received the Xhtml data from the PDA 103 via the Bluetooth driver 1, the BPP 5 transmits the data to the buffer management portion 19 such that the data are stored in the buffer via the buffer management portion 19 (S6), and then transmits a reception possible signal to the PDA 103 (S7). The BPP 5 then retrieves the Xhtml data stored in the buffer via the buffer management portion 19 and writes the data into the stream pipe via the stream pipe IF 3, or in other words transfers the data to the Xhtml data rendering processing portion 11 over the first data transfer channel 12 (S8). When data transfer is complete, the stream pipe IF 3 notifies the BPP 5 accordingly (to be referred to as "data transfer OK" below) (S9).

When the BPP 5 receives the data transfer OK from the stream pipe IF 3 in response to the data transfer in S8 and receives new print data in response to the transmission of the reception possible signal in S7 (S10 and S15), the BPP 5 executes similar processing to that of S6 through S8 (S1 through S13 and S16 through S18).

If the BPP 5 receives new print data from the PDA 103 in response to transmission of the reception possible signal to the PDA 103 before receiving the data transfer OK from the stream pipe IF 3 in response to data transfer over the stream pipe (S19), then the BPP 5 stores the new print data in the buffer (S20), and transmits an OBEX Put Response to the PDA 103 (S21) such that data transfer is not performed over the stream pipe. The BPP 5 then repeats the processing of S19 through S21 until a data transfer OK is received from the stream pipe IF 3. Having received the data transfer OK from the stream pipe IF 3, the BPP 5 transfers a job ID corresponding to all or a desired part of the unsent data to the buffer management portion 19 in order to retrieve the data corresponding to the job ID from the buffer via the buffer management portion 19, whereupon the retrieved data are transferred over the first data transfer channel 12.

When the BPP 5 receives an OBEX Final Put (Send Document) from the PDA 103 in response to an OBEX Put Response, or in other words a signal indicating transmission of the final data and that no more data are to be transmitted (S22), the BPP 5 executes processing to close the stream pipe (here, the first data transfer channel 12).

More specifically, the BPP 5 stores the received final data in the buffer via the buffer management portion 19 (S23), and transmits an OBEX Final Put Response to the PDA 103 as a response signal to the OBEX Final Put (Send Document) (S24). Having received a data transfer OK from the stream pipe IF 3 (S25), the BPP 5 transfers the final data over the stream pipe (S26), and having received a data transfer OK from the stream pipe IF 3 (S27), the BPP 5 orders the stream pipe IF 3 to close the stream pipe (S28). Once the BPP 5 has received notification from the stream pipe IF 3 in response thereto that closing of the stream pipe is complete (S29), the printing sequence of the BPP 5 ends.

Figure 3:
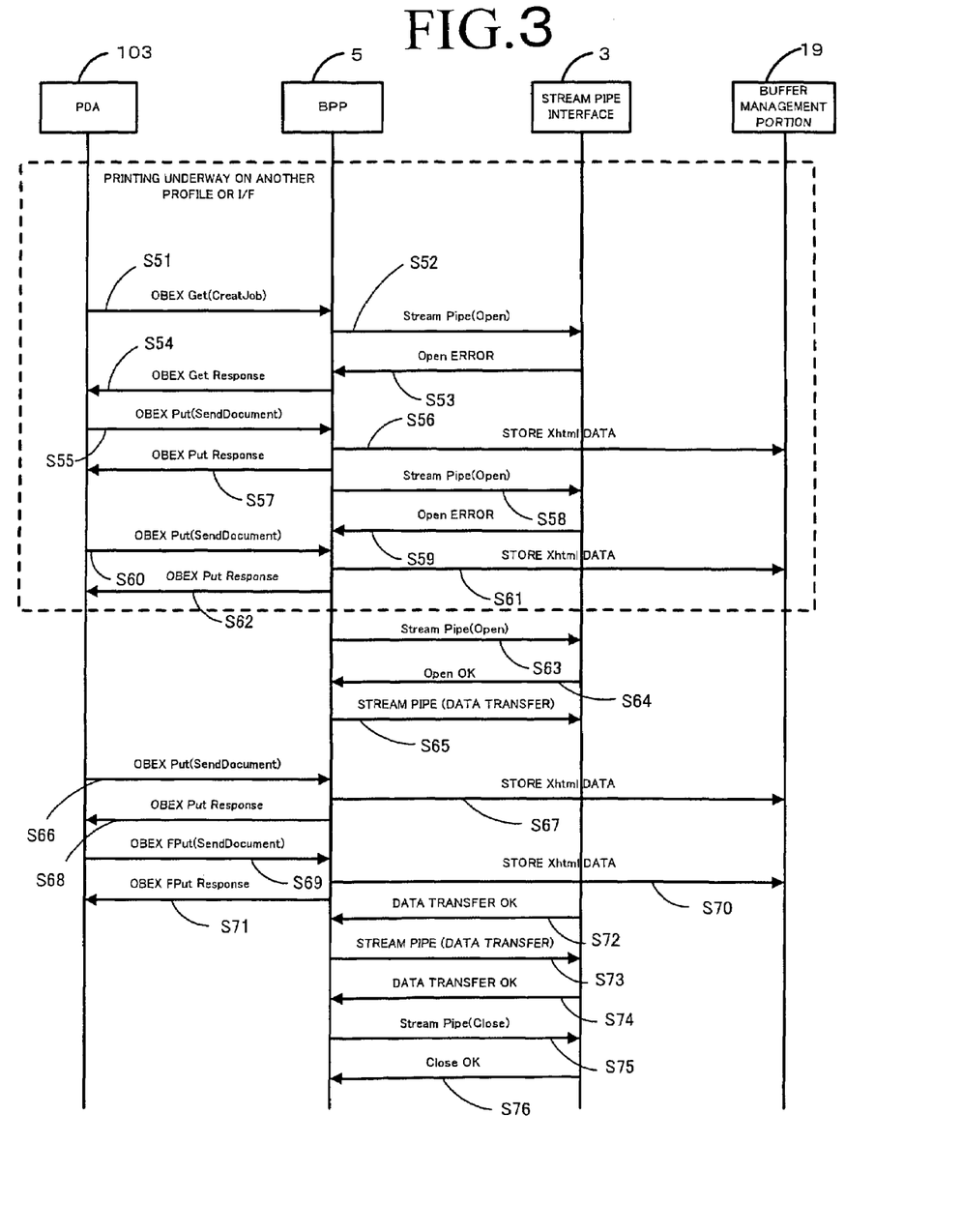
FIG. 3 is a view showing a printing sequence of the BPP in a case where the first data transfer channel 12 cannot be opened.

FIG. 3 shows a printing sequence of the BPP 5 when the first data transfer channel 12 cannot be opened.

When a job creation request is received by the BPP 5 from the PDA 103 while the first data transfer channel 12 cannot be opened, or more specifically, while data communication is being performed through an interface other than the first data transfer channel 12 (for example, the second or third data transfer channel 14 or 16, or an interface not shown in the drawings such as a USB linking the printer 100 to a host device not shown in the drawings) or the like, the BPP 5 requests the stream pipe IF 3 to open the first transfer channel 12 in response to the job creation request (S52). At that time, the stream pipe IF 3 is unable to open the first transfer channel 12, and therefore notifies the BPP 5 to that effect (to be referred to as an "open error" below) (S53).

However, the BPP 5 transmits the same OBEX Get Response as that transmitted upon reception of an open OK, or in other words a reception possible signal, to the PDA 103 even after receiving notification of an open error from the stream pipe IF 3 (S54). Having received the reception possible signal from the BPP 5, the PDA 103 transmits an OBEX Put (Send Document) packet, or in other words print data (Xhtml data) to the BPP 5 (S55).

Having received the Xhtml data from the PDA 103, the BPP 5 hands the data over to the buffer management portion 19, whereby the data are stored in the buffer via the buffer management portion 19 (S56), and then transmits a reception possible signal to the PDA 103 (S57) and once again requests the stream pipe IF 3 to open the first transfer channel 12 (S58). Even if the BPP 5 receives another open error from the stream pipe IF 3 in response thereto (S59), the BPP 5 receives print data from the PDA 103 (S60), stores the data in the buffer (S61), and transmits a reception possible signal to the PDA 103 (S62).

In other words, when a print job creation request or print data are received from the PDA 103 while data exchange is underway between the stream pipe IF 3 and another profile 7 or 9 such that the first data transfer channel 12 cannot be opened, the BPP 5 sends a reception possible signal rather than an error to the PDA 103, enabling reception of print data from the PDA 103. However, the BPP 5 simply stores the received print data in the buffer and does not transfer the print data to the downstream (that is, upper level) rendering processing portion 11.

Further, when the first data transfer channel 12 cannot be opened, the BPP 5 uses a timer or the like to command the stream pipe IF 3 to open the first data transfer channel 12 repeatedly at a predetermined timing (for example, as needed or periodically) until notification that the first data transfer channel 12 has been opened is received from the stream pipe IF 3. Once the BPP 5 has received notification from the stream pipe IF 3 in response thereto that the first data transfer channel 12 is open (S63 and S64), the printing sequence described with reference to FIG. 2 is executed (S65 to S76). Note that if the available space in the buffer is smaller than the data size of the print data when print data are to be stored in the buffer (for example, when there is no available space in the buffer), the BPP 5 delays transmission of the reception possible signal (that is, the OBEX Put Response) to the PDA 103 until the available space in the buffer equals or exceeds the size of the print data. When the available space in the buffer equals or exceeds the size of the print data, the BPP 5 transmits the reception possible signal to the PDA 103 so as to receive the next print data.

Figure 4:
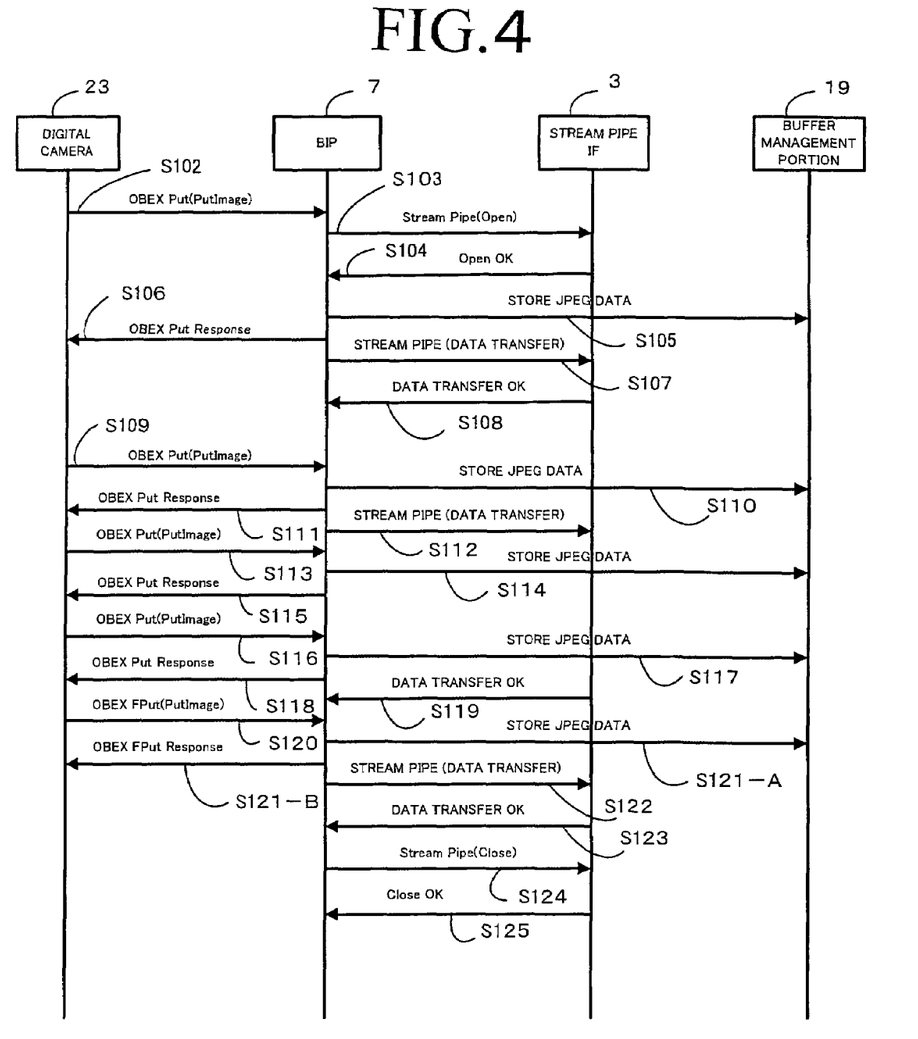
FIG. 4 is a view showing a printing sequence of a BIP 7 in a case where a second data transfer channel 14 can be opened.

FIG. 4 shows a printing sequence of the BIP 7 when the second data transfer channel 14 can be opened.

The digital camera 105 requests an OBEX Put (Put Image), or in other words JPEG image data to be subject to printing, of the BIP 7 (step S102). In response, the BIP 7 transmits a Stream Pipe (Open) packet to the stream pipe IF 3, or in other words requests the stream pipe IF 3 to open the second transfer channel 14 (or in other words, form the second transfer channel 14) (S103). If the stream pipe IF 3 is able to open the second transfer channel 14, the channel is opened and notification is sent to the BIP 7 that the second transfer channel 14 has been opened (to be referred to as "open OK" below) (S104).

Having received notification of the open OK from the stream pipe IF 3, the BIP 7 stores the JPEG data received in S102 in a buffer via the buffer management portion 19 (S105), and transmits an OBEX Put Response, or in other words a reception possible signal, to the digital camera 105 (S106). The BIP 7 also retrieves the JPEG data stored in the buffer in S105 via the buffer management portion 19, and writes the data into the stream pipe via the stream pipe IF 3, or in other words transfers the data to the JPEG data rendering processing portion 13 over the second data transfer channel 14 (S107). When data transfer is complete, the stream pipe IF 3 transmits a data transfer OK to the BIP 7 (S108).

When The BIP 7 receives the data transfer OK from the stream pipe IF 3 in response to the data transfer performed in S107, and receives new JPEG data in response to the transmission of the reception possible signal in S106 (S109), similar processing to that of S104 through S106 described above is executed (S110 through S112).

If, on the other hand, the BIP 7 receives new print data from the digital camera 105 in response to transmission of the reception possible signal to the digital camera 105 before receiving the data transfer OK from the stream pipe IF 3 in response to the data transfer (S113), then the BIP 7 stores the new print data in the buffer (S114) and transmits an OBEX Put Response to the digital camera 105 (S115) such that data transfer is not performed over the stream pipe. The BIP 7 repeats the processing of S113 and S114 until a data transfer OK is received from the stream pipe IF 3 (S115 through S118). Having received the data transfer OK from the stream pipe IF 3, the BIP 7 retrieves the data corresponding to all or a desired part of the unsent data from the buffer via the buffer management portion 19, and transfers the retrieved data over the second data transfer channel 14 (S122).

When the BIP 7 receives an OBEX Final Put (Put Image) from the digital camera 105 in response to an OBEX Put Response, or in other words a signal indicating transmission of the final JPEG data and that no more JPEG data are to be transmitted (S120), the BIP 7 executes processing to close the stream pipe (here, the second data transfer channel 14).

More specifically, the BIP 7 stores the received final data in the buffer via the buffer management portion 19 (S121-A), and transmits an OBEX Final Put Response to the digital camera 105 as a response signal to the OBEX Final Put (Put Image) (S121-B). Then, in response to the data transfer OK transmitted in S119, the BIP 7 transfers the data comprising the final data which were stored in S121-A over the stream pipe (S122), and having received a data transfer OK from the stream pipe IF 3 (S123), the BIP 7 orders the stream pipe IF 3 to close the stream pipe (S124). Once the BIP 7 has received notification from the stream pipe IF 3 in response thereto that closing of the stream pipe is complete (S125), the printing sequence of the BIP 7 ends.

Figure 5:
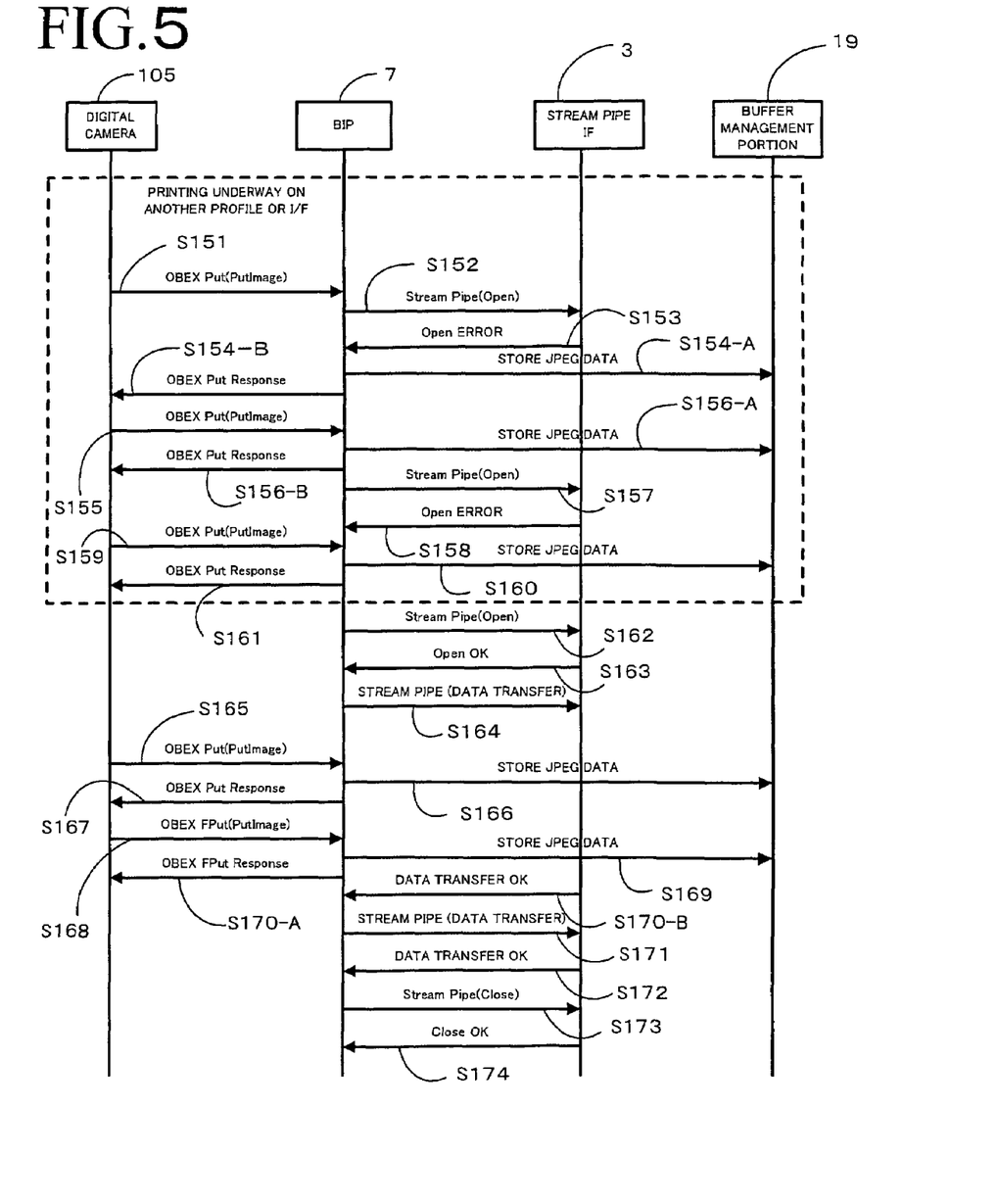
FIG. 5 is a view showing a printing sequence of the BIP in a case where the second data transfer channel 14 cannot be opened.

FIG. 5 shows a printing sequence of the BIP 7 when the second data transfer channel 14 cannot be opened.

When JPEG data are received by the BIP 7 from the digital camera 105 while the second data transfer channel 14 cannot be opened, or more specifically while data communication is being performed through an interface other than the second data transfer channel 14 (for example, the first or third data transfer channel 12 or 16, or an interface not shown in the drawings such as a USB linking the printer 100 to a host device not shown in the drawings), for example (S151), the BIP 7 requests the stream pipe IF 3 to open the second transfer channel 14 in response thereto (S152). At that time, the stream pipe IF 3 is unable to open the second transfer channel 14, and therefore transmits an open error to the BIP 7 (S153). The BIP 7 then stores the received JPEG data in a buffer (S154-A).

The BIP 7 transmits the same OBEX Put Response as that transmitted upon reception of an open OK, or in other words a reception possible signal, to the digital camera 105 even after receiving notification of an open error from the stream pipe IF 3 (S154-B). Having received the reception possible signal from the BIP 7, the digital camera 105 transmits JPEG data to the BIP 7 (S155).

Having received the JPEG data from the digital camera 105, the BIP 7 stores the data in the buffer via the buffer management portion 19 (S156-A), and then transmits a reception possible signal to the digital camera 105 (S156-B) and once again requests the stream pipe IF 3 to open the second transfer channel 14 (S157). Even if the BIP 7 receives another open error from the stream pipe IF 3 in response thereto (S158), the BIP 7 receives print data from the digital camera 105 (S159), stores the data in the buffer (S160), and transmits a reception possible signal to the digital camera 105 (S161).

In other words, when print data are received from the digital camera 105 while data exchange is underway between the stream pipe IF 3 and another profile 5 or 9 such that the second data transfer channel 14 cannot be opened, the BIP 7 sends a reception possible signal rather than an error to the digital camera 105, enabling reception of print data from the digital camera 105. However, the BIP 7 simply stores the received print data in the buffer and does not transfer the print data to the downstream (that is, upper level) rendering processing portion 13.

Further, when the second data transfer channel 14 cannot be opened, the BIP 7 uses a timer or the like to command the stream pipe IF 3 to open the second data transfer channel 14 repeatedly at a predetermined timing (for example, as needed or periodically) until notification that the second data transfer channel 14 has been opened is received from the stream pipe IF 3. Once the BIP 7 has received notification from the stream pipe IF 3 in response there to that the second data transfer channel 14 is open (S162 and S163), the printing sequence described with reference to FIG. 4 is executed (S164 to S174). Note that if the available space in the buffer is smaller than the data size of the print data when print data are to be stored in the buffer (for example, when there is no available space in the buffer), the BIP 7 delays transmission of a reception possible signal (that is, an OBEX Put Response) to the digital camera 105 until the available space in the buffer equals or exceeds the size of the print data. When the available space in the buffer equals or exceeds the size of the print data, the BIP 7 transmits the reception possible signal to the digital camera 105 in order to receive the next print data.

Figure 6:
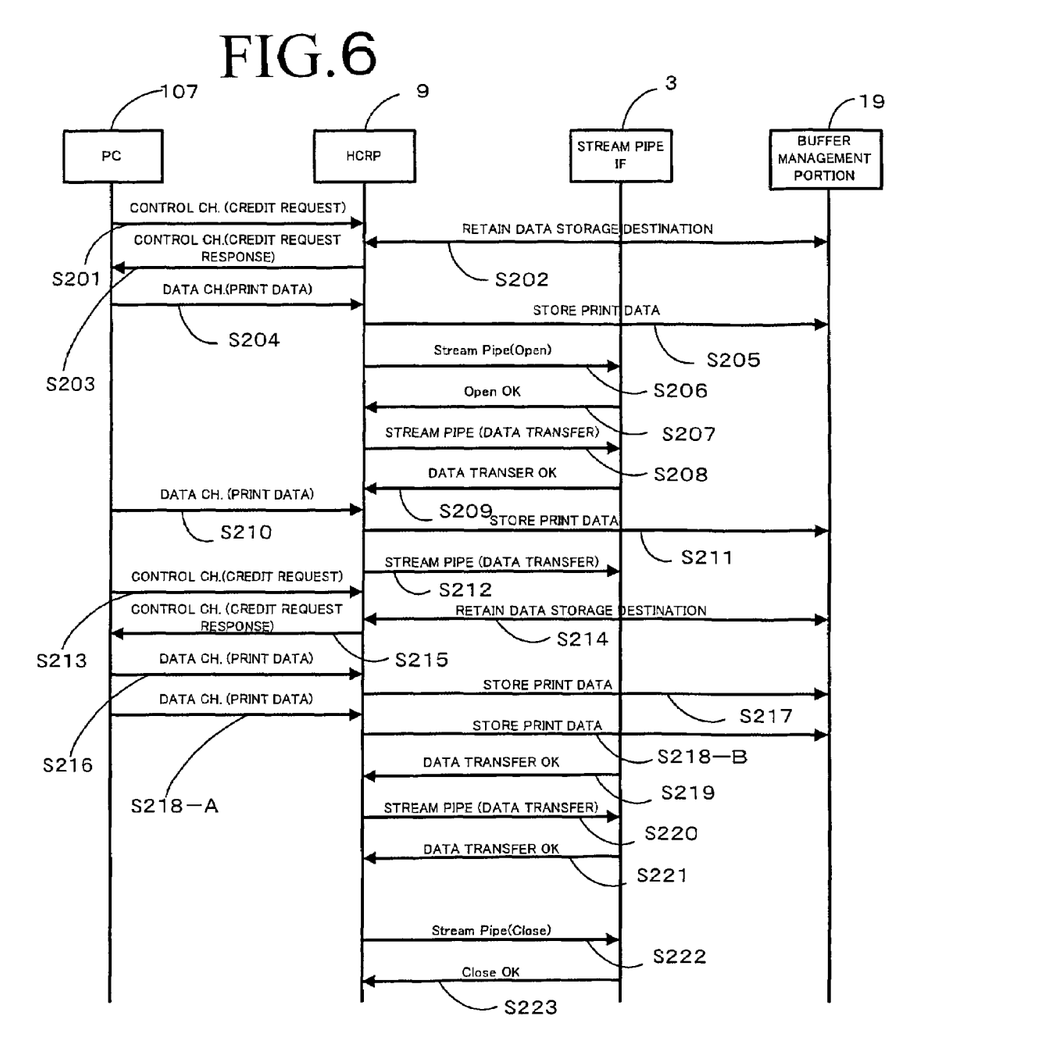
FIG. 6 is a view showing a printing sequence of an HCRP in a case where a third data transfer channel 16 can be opened.

FIG. 6 shows a printing sequence of the HCRP 9 when the third data transfer channel 16 can be opened.

Predetermined channels, or in other words two channels, a control channel and a data channel, connect the PC 107 and the HCRP 9. The control channel performs transmission and reception of printing device control commands, acquirement and provision of a credit value to be described below for exchanging data on the data channel, and so on. The data channel is used to transmit and receive print data on the basis of the credit value. The credit value indicates the data size of the data that can be received by the printing device 100, and is set at a value equal to or less than the available buffer space. The credit value may be constant or variable. When constant, the credit value is set on the basis of the buffer capacity, for example, and when variable, the credit value is determined by the CPU of the printing device 100 on the basis of the available buffer capacity, for example.

When print data are to be transmitted, the PC 107 first transmits a Control Ch. (Credit Request) packet to the HCRP 9. In other words, the HCRP 9 is requested to provide notification of the credit value (S201).

In response thereto, the HCRP 9 causes the buffer management portion 19 to retain a recording region (data storage destination) having an available space that is equivalent to the predetermined credit value, or sets the size of the recording region retained by the buffer management portion 19 as the credit value (S202). The HCRP 9 then transmits a Control Ch. (Credit Request Response) to the PC 107, or in other words informs the PC 107 of the credit value (S203).

The PC 107 transmits print data to the HCRP 9 on the basis of the informed credit value (S204). The HCRP 9 receives the print data from the PC 107 and stores the print data in a buffer via the buffer management portion 19 (S205). The HCRP 9 then requests the stream pipe IF 3 to open the third transfer channel 16 (that is, to form the third transfer channel 16) (S206). If the stream pipe IF 3 is able to open the third transfer channel 16, the channel is opened and an open OK is transmitted to the HCRP 9 (S207).

Having received notification of the open OK from the stream pipe IF 3, the HCRP 9 retrieves the print data stored in the buffer via the buffer management portion 19, and writes the data into the stream pipe via the stream pipe IF 3, or in other words transfers the data to the parallel data processing portion 15 over the third data transfer channel 16 (S208). When data transfer is complete, the stream pipe IF 3 transmits a data transfer OK to the HCRP 9 (S209).

When the HCRP 9 receives the data transfer OK from the stream pipe IF 3 in response to the data transfer performed in S208, and then receives new print data (S210), the print data are stored in the buffer (S211), whereupon the stored print data are retrieved from the buffer and transferred to the parallel data processing portion 15 over the third data transfer channel 16 (S212).

At a predetermined time, when the PC 107, for example completes transmission of print data corresponding to the credit value notified in S203 but unsent print data still remain, the PC 107 requests the HCRP 9 to provide notification of the credit value again (S203).

In response, the HCRP 9 performs similar processing to that of S202 (S214) to inform the PC 107 of the credit value (S215). Then, having received print data from the PC 107 (S216) the HCRP 9 stores the print data in the buffer (S217).

If the HCRP 9 receives new print data from the PC 107 before receiving a data transfer OK from the stream pipe IF 3 in response to the data transfer over the stream pipe performed in S212 (S216 and S218-A), then the new print data are simply stored in the buffer (S217 and S218-B), and data transfer is not performed over the stream pipe. The HCRP 9 performs the processing of S216 and S217 repeatedly until the data transfer OK is received from the stream pipe IF 3 (when a credit value notification request is received, processing for retaining a data storage destination is performed and the PC 107 is informed of the credit value). Having received the data transfer OK from the stream pipe IF 3 (S219), the HCRP 9 retrieves all or a desired part of the unsent print data from the buffer via the buffer management portion 19, and transfers the retrieved data over the third transfer channel 16 (the stream pipe) (S220).

If a predetermined event occurs after the data transfer Ok is received from the stream pipe IF 3 (S221), for example the PC 107 is disconnected (the connected state is canceled), or no print data are received from the PC 107 for a fixed length of time, the HCRP 9 commands the stream pipe IF 3 to close the stream pipe (S222). When the HCRP 9 receives notification from the stream pipe IF 3 in response thereto to the effect that closing of the stream pipe is complete (S223), the printing sequence of the HCRP 9 ends.

Note that in this printing sequence, when a recording region with an available space that is equal to or greater than the credit value has not been retained upon reception of a credit value request, the HCRP 9 provides notification that the credit value is zero, thereby controlling the PC 107 such that print data are not transmitted. When a recording region with an available space that is equal to or greater than the credit value has been retained, the HCRP 9 informs the PC 107 of the credit value.

Figure 7:
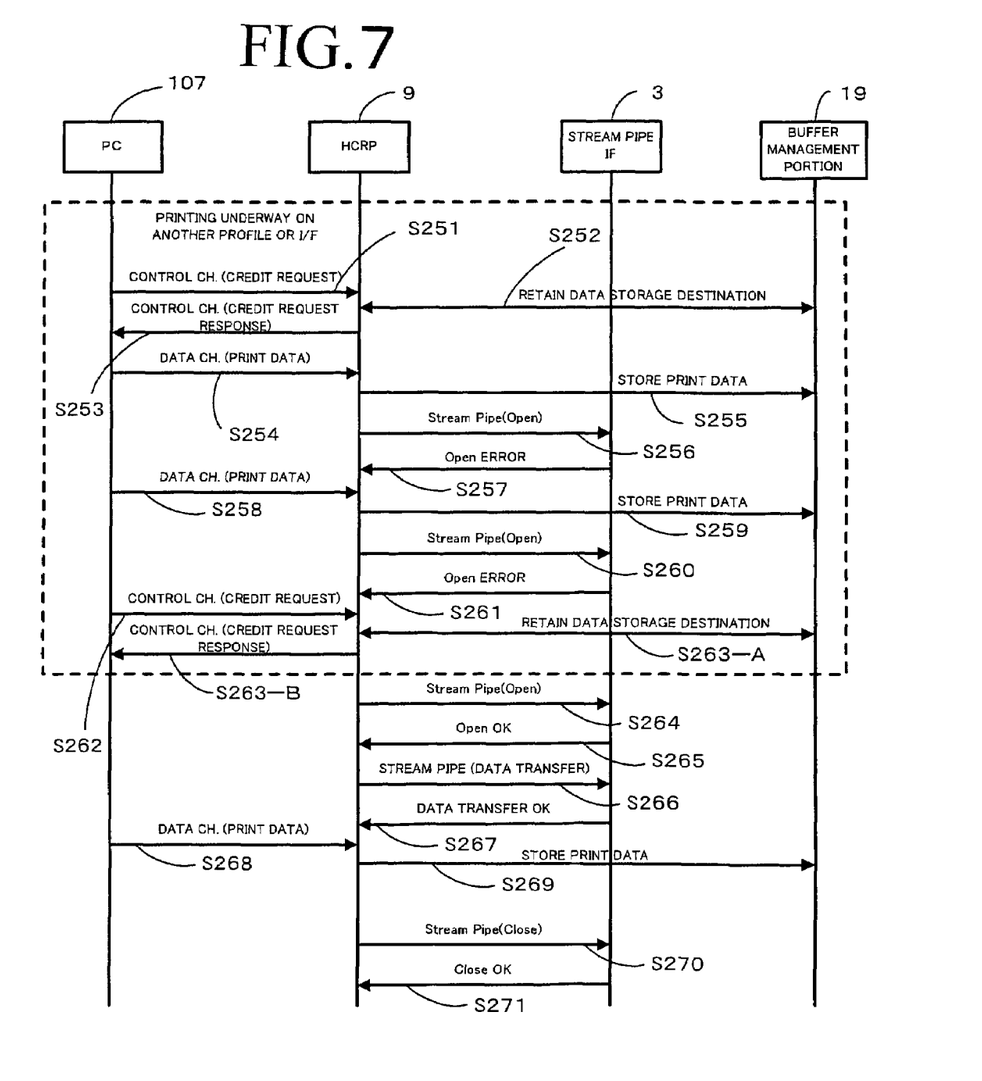
FIG. 7 is a view showing a printing sequence of the HCRP 9 in a case where the third data transfer channel 16 cannot be opened.

FIG. 7 is a printing sequence of the HCRP 9 performed when the third data transfer channel 16 cannot be opened.

If the HCRP 9 receives a credit value notification request from the PC 107 (S251) while the third data transfer channel 16 cannot be opened, or more specifically while data communication is being performed through an interface other than the third data transfer channel 16 (for example, the first or second data transfer channel 12 or 14, or an interface not shown in the drawings such as a USB linking the printer 100 to a host apparatus not shown in the drawings), for example, identical processing to that performed in S202 through S206 of FIG. 6 is performed (S252 through S256).

Even when a request to open the third transfer channel 16 is received in S256, the stream pipe IF 3 is unable to open the third transfer channel 16 and therefore transmits an open error to the HCRP 9 (S257).

Even when notification of an open error is received from the stream pipe IF 3, the HCRP 9 receives print data from the PC 107 (S258) and then stores the data in the buffer via the buffer management portion 19 (S259). The HCRP 9 then transmits another request to the stream pipe IF 3 to open the third transfer channel 16 (S260). Even if another open error is received from the stream pipe IF 3 in response thereto (S261), the HCRP 9 performs the same processing as would have been performed if an open OK had been received, for example retaining a data storage destination (S263-A) upon reception of a credit value request from the PC 107 (S262), and informing the PC 107 of the credit value (S263-B).

In other words, when the third data transfer channel 16 cannot be opened, the HCRP 9 does not send an error to the PC 107 in response to a credit value notification request or the reception of print data from the PC 107, but instead allows print data to be received from the PC 107. Note, however, that the HCRP 9 merely stores the received print data in the buffer and does not transfer the print data to the downstream (or in other words, upper level) parallel data processing portion 15.

Moreover, when the third data transfer channel 16 cannot be opened, the HCRP 9 uses a timer or the like to command the stream pipe IF 3 to open the third data transfer channel 16 repeatedly at a predetermined timing (for example, as needed or periodically) until notification that the third data transfer channel 16 has been opened is received from the stream pipe IF 3. Once the HCRP 9 has received notification from the stream pipe IF 3 in response thereto that the third data transfer channel 16 is open (S264 or S265), the printing sequence described with reference to FIG. 6 is executed (S266 to S271).

This embodiment is as described above.

According to the embodiment described above, when the printing device 100 detects a connection request (enquiry) outputted from the second external device (for example, the digital camera 105) while connected to the first external device (for example, the PDA 103), first the role of the printing device is set as a communication slave, and then, at a predetermined timing (for example, when a physical connection is established), the role of the device is altered either automatically or manually from a communication slave to a communication master. In so doing, the printing device 100 can be connected to both the first and second external devices and receive print data from both the first and second external devices in parallel.

Also according to the embodiment described above, even when the data transfer channel to which each of the profiles 5, 7, 9 inside the printing device 100 is connected has been closed, or in other words when print data cannot be transferred to the down stream data processing portions 11, 13, 15, the profile 5, 7, or 9 transmits an identical response signal to that employed when the connected data transfer channel is open to the communication partner external device, or delays transmission of the response signal. As a result, the communication partner external device does not have to perform the same operation anew. In other words, when designing the external devices, no special design specifications regarding the type of operation that is performed when an error is received from the communication partner profile need be considered.

A preferred embodiment of the present invention was described above, but this embodiment is merely employed as an example to illustrate the present invention, and the scope of the present invention is not limited to this embodiment alone. The present invention may be implemented in various other forms.

Figure 8:
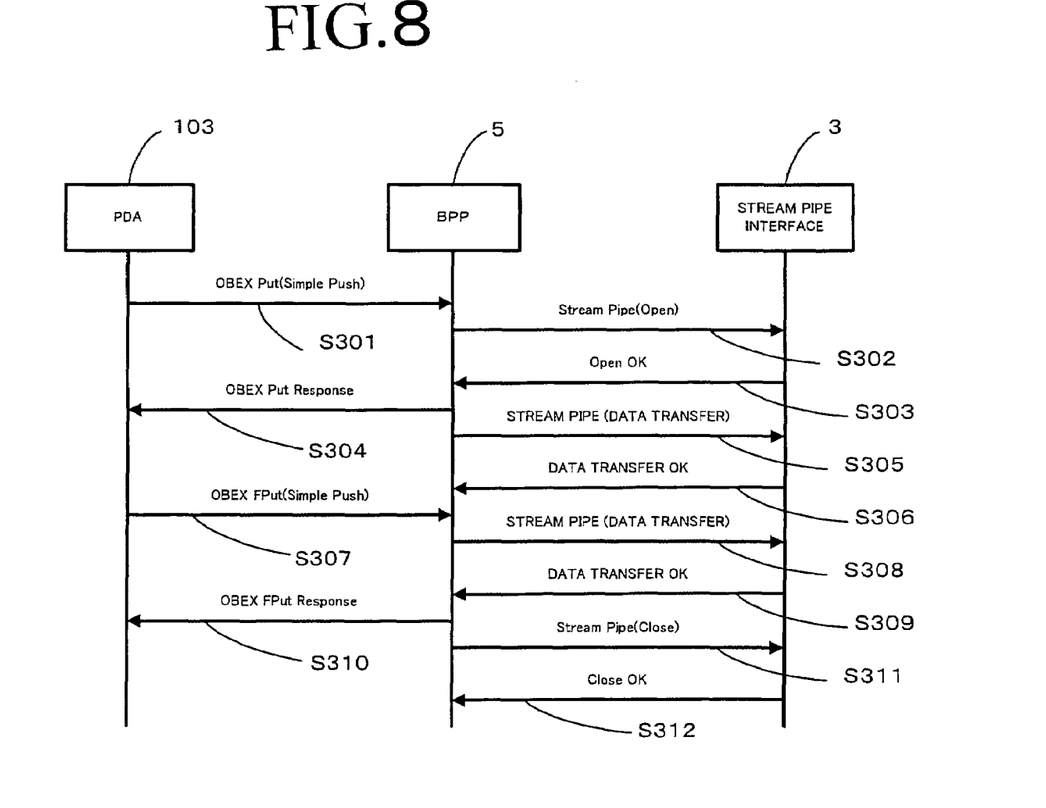
FIG. 8 is a view showing a printing sequence of the BPP 5 in a case where printing is executed according to a simple push model.

For example, the BPP 5 may perform printing using printing processing such as a Simple Push Model, for example, rather than Job-Based Transfer. In this case, as shown in FIG. 8, the BPP 5 first receives print data from the PDA 103 as an OBEX Put (Simple Push) (S301), and then requests the stream pipe IF 3 to open the first data transfer channel 12 (S302). If the first transfer channel 12 can be opened, the stream pipe IF 3 opens the channel and transmits an open OK to the BPP 5 (S303).

Having received notification of the open OK from the stream pipe IF 3, the BPP 5 transmits an OBEX Put Response, or in other words a reception possible signal, to the PDA 103 (S304), and transfers the received print data to the Xhtml data rendering processing portion 11 via the stream pipe IF 3 (S305).

Then, having received a data transfer OK (S306), the BPP 5 repeats S304 and S305. When the BPP 5 receives an OBEX Final Put (Simple Push) from the PDA 103, or in other words a signal indicating transmission of the final data and that no more data are to be transmitted (S307), the BPP 5 executes processing to close the stream pipe (S308 through S312).

In this printing processing, when the BPP 5 receives an open error in S303, for example, indicating that the first data transfer channel 12 cannot be opened due to another data transfer channel 14 or 16 being open, the BPP 5 delays transmission of the OBEX Put Response and requests the stream pipe IF 3 to open the first data transfer channel 12 repeatedly at a predetermined timing (for example, as needed or periodically). Once an open OK has been received in response to this request, the BPP 5 transmits the delayed OBEX Put Response to the PDA 103.

What is claimed is:

1. A printing method carried out by a printing device for receiving data from a plurality of data source apparatuses and then printing said data, said method comprising operations of:
    receiving a connection request from a first data source apparatus and establishing a logical connection with said first data source apparatus;
    receiving a connection request from a second data source apparatus;
    initially setting the role of said printing device as a communication slave while a connection is established with said first data source apparatus, and then switching the role of said printing device from a communication slave to a communication master to enable a connection to be established with both said first and second data source apparatuses;
    receiving data from said first and second data source apparatuses while the connections are established with said first and second data source apparatuses;
    processing and printing said data received from said first data source apparatus and said second data source apparatus; and
    further comprising an operation in which, if a logical connection is established with said second data source apparatus and data are received from said second data source apparatus while a connection is established with said first data source apparatus and data received from said first data source apparatus are being transferred to a first data processing portion, from among a plurality of data processing portions for processing data received from said data source apparatuses, then said received data are stored temporarily in a buffer, and
    if said data can be transferred to a second data processing portion, then said data are read from said buffer and transferred to said second data processing portion,
    wherein a logical connection is established with said first and second data source apparatuses in accordance with Bluetooth specifications in said connection operation,
    wherein a profile provided on an upper Object Exchange Protocol (OBEX) level is executed in at least one of said transfer operation and said transmitting back operation, wherein said profile is at least one of a Basic Printing Profile (BPP) and a Basic Imaging Profile (BIP), wherein if at least one of said BBP and said BIP receives a job preparation request from said second data source apparatus in a case where a first data transfer channel corresponding to said first data source apparatus is open, then said at least one of said BBP and said BIP executes operations comprising:

requesting a stream pipe interface portion to open a second data transfer channel corresponding to said second data source apparatus;

transmitting to said second data source apparatus, in response to said request to open said second data transfer channel, a reception possible signal, even if a notice of open error is returned from said stream pipe interface portion;

receiving data from said second data source apparatus;

temporarily storing said data received from said second data source apparatus in said buffer; and if said second data transfer channel is opened, reading out said stored data from said buffer and transferring said stored data to said second data processing portion through said second data transfer channel, wherein said reception possible signal is identical to a signal indicating that said second data transfer channel is open;

wherein said stream pipe interface portion comprises an interface of a stream pipe for forming a plurality of data transfer channels to a plurality of data processing portions, wherein stream pipe interface portion serves to open one of said plurality of data transfer channels and to close all others of said plurality of data transfer channels, and wherein, if a requested one of said plurality of data transfer channels is closed, a request to open said requested data transfer channel is received from a profile, which is capable of connecting with said requested data transfer channel, and if data is not being transmitted over another open one of said plurality of data transfer channels, then said stream pipe interface portion opens said requested data transfer channel and closes all others of said plurality of data transfer channels, and thus enables data to be transferred over said open requested data transfer channel.

2. The printing method according to claim 1, wherein, if available space in said buffer is smaller than a data size of said received data, then said at least one of said BPP and said BIP delays transmission of said reception possible to said second data source apparatus until available space in said buffer equals or exceeds said data size of said received data, and wherein, if available space in said buffer equals or exceeds said data size of said received data, then said at least one of said BPP and said BIP transmits said reception possible signal to said second data source apparatus.

3. A printing method carried out by a printing device for receiving data from a plurality of data source apparatuses and then printing said data, said method comprising operations of:

receiving a connection request from a first data source apparatus and establishing a logical connection with said first data source apparatus;

receiving a connection request from a second data source apparatus;

initially setting the role of said printing device as a communication slave while a connection is established with said first data source apparatus, and then switching the role of said printing device from a communication slave to a communication master to enable a connection to be established with both said first and second data source apparatuses;

receiving data from said first and second data source apparatuses while the connections are established with said first and second data source apparatuses;

processing and printing said data received from said first data source apparatus and said second data source apparatus; and further comprising an operation in which, if a logical connection is established with said second data source apparatus and a request for notification of a credit value indicating the data size of the receivable data is received from said second data source apparatus while a logical connection is established with said first data source apparatus and data received from said first data source apparatus are being transferred to a first data processing portion, from among a plurality of data processing portions for processing data received from said data source apparatuses, then said second data source apparatus is informed of said credit value in response to said notification request, and thus data are received from said second data source apparatus, stored temporarily in a buffer, and if said data can be transferred to a second data processing portion, then said data are read from said buffer and transferred to said second data processing portion, wherein a logical connection is established with said first and second data source apparatuses in accordance with Bluetooth specifications in said connection operation, wherein a profile provided on an upper Object Exchange Protocol (OBEX) level is executed in at least one of said transfer operation and said transmitting back operation, wherein said profile is at least one of a Basic Printing Profile (BPP) and a Basic Imaging Profile (BIP), wherein in a case where a first data transfer channel corresponding to the first data source apparatus is open, and if a Hardcopy Cable Replacement Profile (HCRP) requests a stream pipe interface portion to open a second data transfer channel corresponding to the second data source apparatus, and in response to said request to open said second data transfer channel, receives a notice request of a credit value from said second data source apparatus after a notice of open error is returned from said stream pipe interface portion, then:

even if a notice of open error is returned, after said credit value is notified to said second data source apparatus in response to said notice request, then said HCRP receives data from said second data source apparatus;

if said HCRP is notified of said credit value of said second data source apparatus, then said HCRP requests said stream pipe interface portion to open said second data transfer channel;

in response to said request of said stream pipe interface portion to open said second data transfer channel, if a notice of open error is returned from said stream pipe interface portion, then said HCRP temporarily stores data in said buffer; and if said second data transfer channel is opened, then HCRP reads out said data from said buffer and transfers said data from said buffer to said second data processing portion through said second data transfer channel;

wherein said stream pipe interface portion comprises an interface of a stream pipe for forming a plurality of data transfer channels to a plurality of data processing portions, wherein stream pipe interface portion serves to open one of said plurality of data transfer channels and to close all others of said plurality of data transfer channels, and wherein, if a requested one of said plurality of data transfer channels is closed, a request to open said requested data transfer channel is received from a profile, which is capable of connecting with said requested data transfer channel, and if data is not being transmitted over another open one of said plurality of data transfer channels, then said stream pipe interface portion opens said requested data transfer channel and closes all others of said plurality of data transfer channels, and thus enables data to be transferred over said open requested data transfer channel.

4. The printing method according to claim 3, wherein said HCRP transmits back a credit value indicating zero to said second data source apparatus in said transfer operation if said HCRP cannot retain an empty region having a size which is equal to or greater than said credit value in said buffer upon reception of said credit value notification request from said second data source apparatus.

\* \* \* \* \*